United States Patent
Hull

[19]

[11] Patent Number: 6,096,971
[45] Date of Patent: Aug. 1, 2000

[54] ADAPTABLE, OVERHEAD LINE VIBRATION DAMPING/SAG ADJUSTMENT DEVICE

[76] Inventor: Norman Douglas Hull, 479 S. Dudley St., Lakewood, Colo. 80226

[21] Appl. No.: 09/181,354

[22] Filed: Oct. 28, 1998

[51] Int. Cl.⁷ .............................. H02G 7/00; H02G 7/14
[52] U.S. Cl. .................... 174/42; 174/40 R; 174/40 TD; 174/45 TD
[58] Field of Search ................... 174/40 TD, 45 TD, 174/42, 154, 155, 156, 160

[56] References Cited

U.S. PATENT DOCUMENTS

| | | |
|---|---|---|
| 1,259,597 | 3/1918 | Breen . |
| 1,671,659 | 5/1928 | Varney ...................................... 174/42 |
| 1,676,006 | 7/1928 | Crook ...................................... 174/42 |
| 2,831,048 | 4/1958 | Weaver . |
| 3,380,061 | 4/1968 | Larson et al. . |
| 3,553,345 | 1/1971 | Edwards . |
| 3,664,620 | 5/1972 | Branum ...................................... 248/63 |
| 3,773,967 | 11/1973 | Sturm ...................................... 174/42 |
| 3,778,527 | 12/1973 | Nigol ...................................... 174/42 |
| 4,686,325 | 8/1987 | Marsico et al. . |
| 4,714,799 | 12/1987 | Hawkins ...................................... 174/42 |

*Primary Examiner*—Hyung-Sub Sough
*Assistant Examiner*—Mark Olds
*Attorney, Agent, or Firm*—Dorr, Carson, Sloan & Birney, P.C.

[57] ABSTRACT

Adaptable, line vibration damping/sag adjustment devices are provided with hollow regions that facilitate drilling of larger holes in the devices so that the devices can hold and clamp lines having correspondingly large diameters.

8 Claims, 5 Drawing Sheets

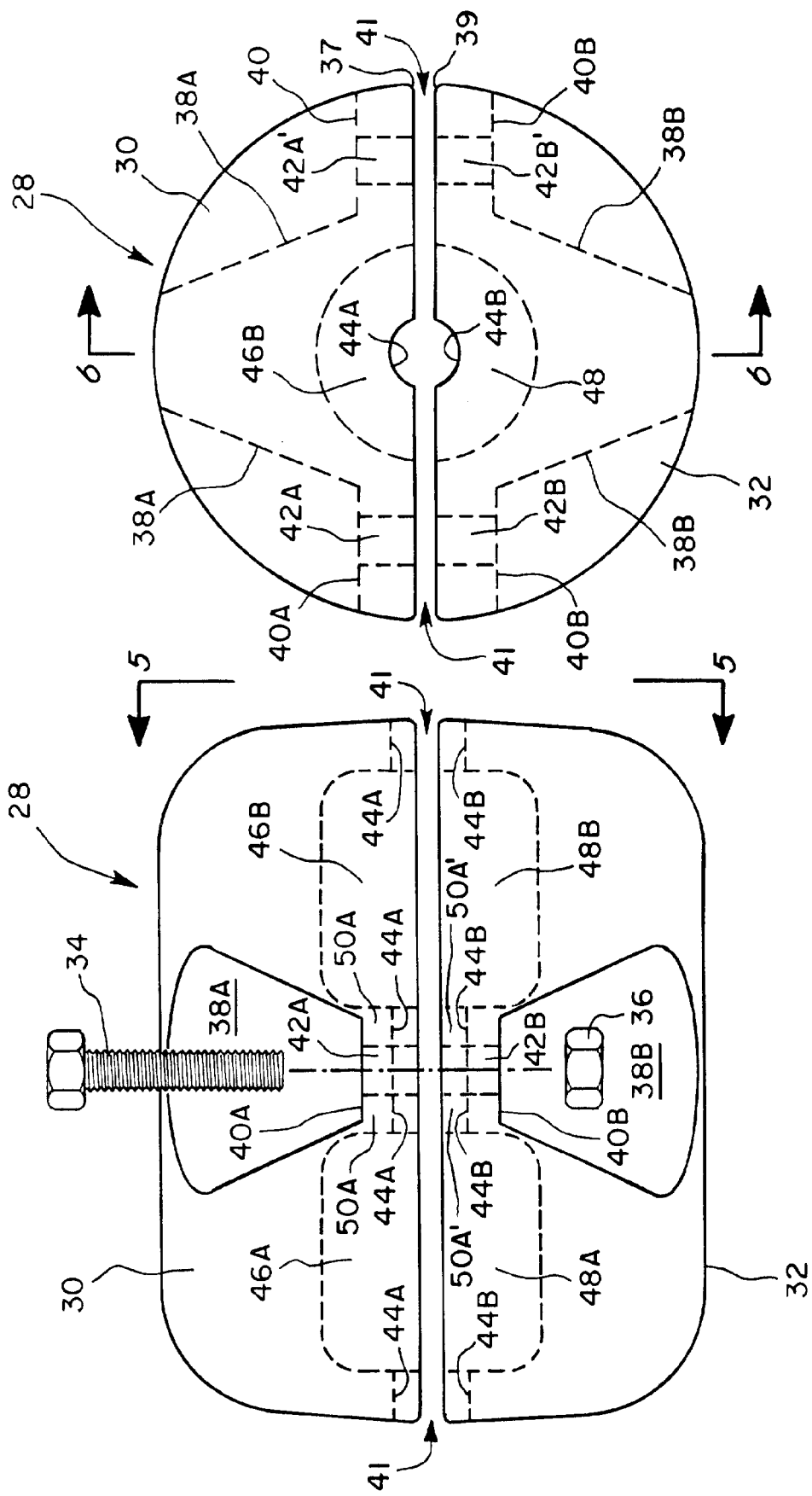

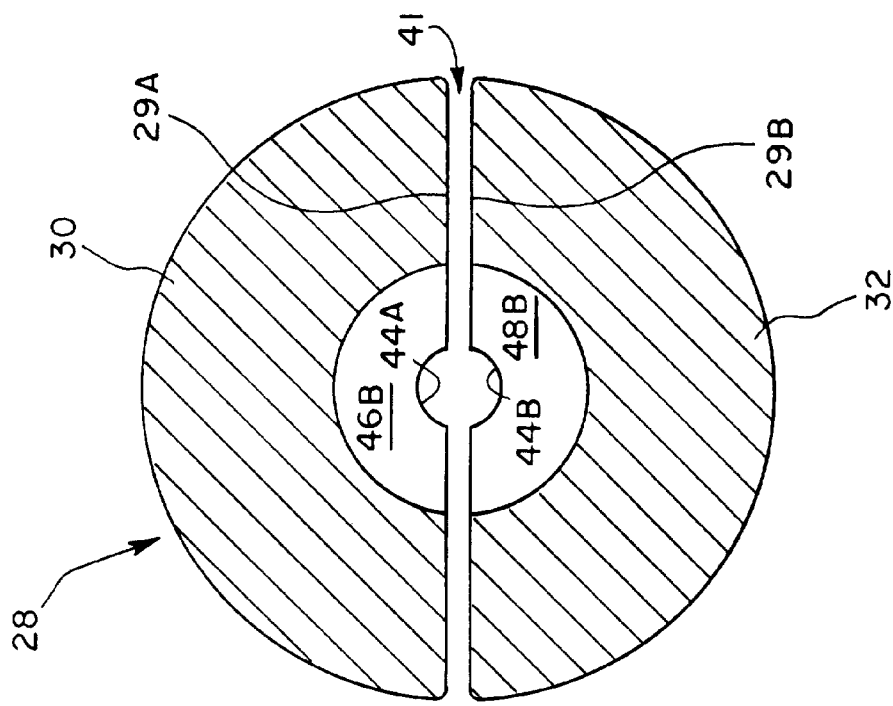
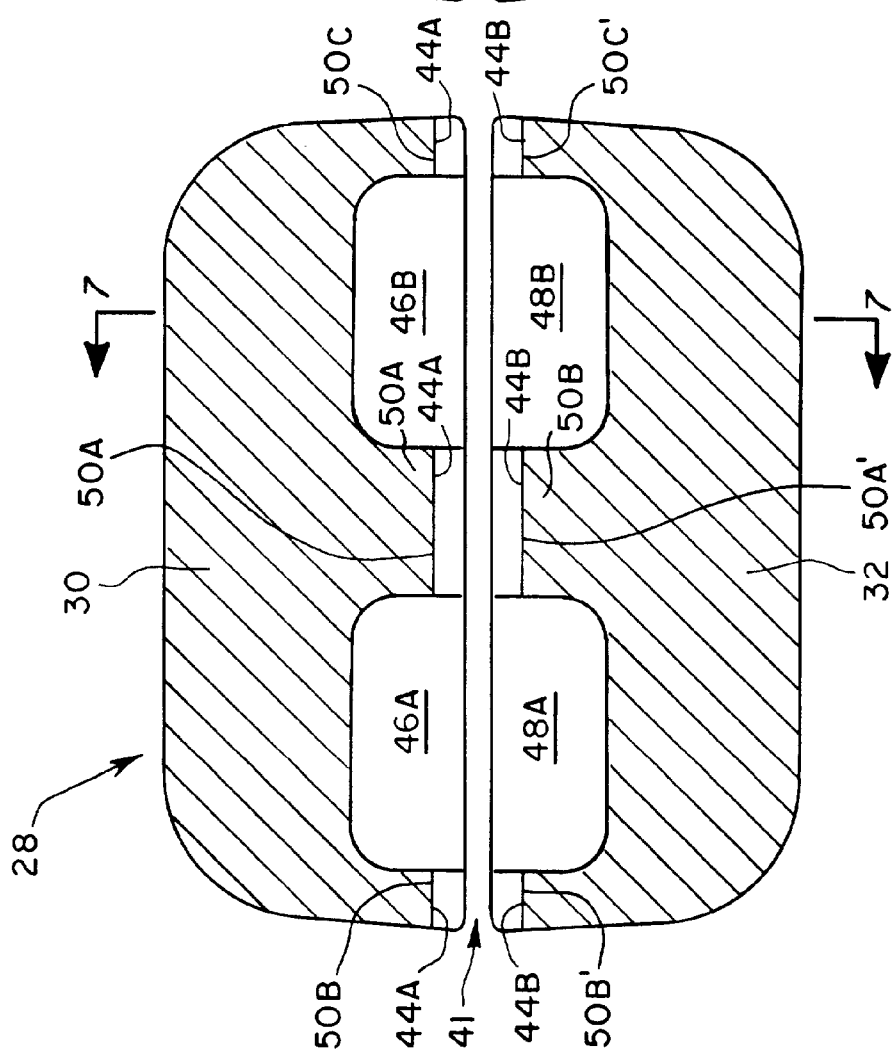

ADAPTABLE, OVERHEAD LINE VIBRATION DAMPING/SAG ADJUSTMENT DEVICE

BACKGROUND OF THE INVENTION

1. Field of the Invention

This invention generally relates to those devices used to dampen vibratory motion, and/or adjust sag, in overhead lines (e.g., electrical power transmission lines, telephone lines, ground wires, guy wires and the like). These vibration damping and sag adjustment functions are both accomplished by virtue of the fact that the highly concentrated body weight of these devices is placed at select locations on such lines.

The two most common vibratory motions dampened by such devices are so-called "aeolian" vibrations, and so-called "galloping" vibrations. Aeolian vibrations are caused by wind eddies created on the lee side of overhead lines during relatively light winds (e.g., those having velocities of about 1 to 15 miles per hour). If the frequency of such eddies happens to coincide with one of the many natural frequencies of a given line span, the resulting vibratory forces can weaken or damage the line at its insulator or anchor points.

Galloping vibrations are often caused by formation of ice on the windward side of an overhead line. In effect, ice formation of this kind gives the line an airfoil-like cross sectional configuration. Hence, even under relatively moderate winds (e.g., those having velocities of about 10–35 miles per hour), these airfoil-like configurations can create very powerful aerodynamic lift and drag forces on these lines. These forces sometimes induce "galloping" motions in such lines. These galloping motions are often exceedingly destructive to the lines, their insulator and anchor points and even the poles, towers, etc. that support them.

Vibration damping devices also are used to reduce sags in, and/or increase local clearances of, a given overhead line span. For example, a line span having a catenary sag contour (which is the natural curve that results from the uniform weight per unit of length of a flexible line) can be adjusted such that a given section of that line can be raised while another section is lowered. This type of sag adjustment is accomplished by weighting a given line span at one or more select points.

Those skilled in this art also will appreciate that the magnitude of a given line sag also may be affected by such factors as: the weight of the line per lineal foot, its diameter, the tension under which it is installed, the length of the span under consideration and the insulator and other hardware configurations employed on it. Similarly, because the devices of this patent disclosure provide both their vibration damping function and their sag adjustment function by virtue of their creation of heavy, concentrated weight(s) at select points along a given line span, the overall effects of the weight of these devices on a given line span also must be taken into account. For example, the effects of their concentrated weight (s), with respect to increased vertical loads, differential longitudinal loads and increased tensions on the conductors, cables, strands, wires, insulators, hardware, dampers and support structures, all must be taken into consideration. The effects of temperature, wind and ice conditions that a given overhead line will encounter also must be considered when considering the deployment of vibration damping/sag adjustment devices.

Such devices also are sometimes used to reduce so-called radio influence voltage (RIV) problems that can result from inadequate loading of insulator strings that are frequently placed on such lines.

Such devices are also useful in counteracting so-called "uplift" conditions (static uplifting forces that result from constructing overhead lines on the lower regions of step terrains), especially when the line support structures being used in such lower regions are not provided with bracing to combat uplift forces. Such devices are also sometimes used in forming so-called "jumper strings" at line end ("dead end") support structures.

2. Description of Prior Art

U.S. Pat. No. 1,676,006 discloses an anti-oscillation scheme for an overhead line such as an electrical power line. The scheme employs weighted devices at node points in the overhead wire system such that the periods of oscillation of each adjacent line span are rendered incommensurable. These anti-oscillation devices are in the form of a ball-like clamp that is split in the middle to form two hemisphere-like portions. The overhead line passes through a hole in the center of the ball-like clamp. The two hemisphere-like portions of the clamp are held together by clamping bolts. The hole through which the line passes is substantially circular (i.e., each hemisphere of the clamp has a uniform semicircular trough passing through its center).

U.S. Pat. No. 3,553,345 discloses a overhead line vibration damping device comprised of a tube that is attached to a ball-like weighting device. The ball-like weighting device is comprised of two hemispherical portions that are secured together with bolts. The ball-like clamp is adapted to fit around the overhead line and one end of the tube. The ball-like device, in effect, has a two sized hole, i.e., a hole having two different diameters. The first part of the hole encompasses the cable and the second part encompasses one end of the tube. The cable itself passes through both the ball-like device and the tube.

U.S. Pat. No. 4,686,325 teaches a method for adjusting the catenary sag in cable systems. The method essentially involves loading adjacent spans in order to "take up" certain local sag conditions in the overall line system.

U.S. Pat. No. 2,831,048 teaches a device for damping "galloping" in overhead lines. The device comprises a (1) lever arm that is pivotally mounted on a cross arm of a support, (2) an insulator connected to one end of the lever (the insulator supports the line), (3) a weight that is supported adjacent to the other end of the lever arm (in order to counterbalance the mass of the insulator and line) and (4) a restraining member connected to the cross arm which all, acting in concert, serve to dampen gallop in an overhead line.

The prior art also discloses that a wide variety of materials have been used to make vibration damping/sag adjustment devices. For example, lead (and lead alloys), zinc (and zinc alloys), specific lead/zinc alloys, tungsten (and tungsten alloys), cast iron, polymeric materials (such as so-called "hard rubber") and even concrete have been used to make vibration damping/sag adjustment devices.

SUMMARY OF THE INVENTION

The present invention is a vibration damping/sag adjustment devices that is especially characterized by the fact that it has at least two distinct interior hollow regions. These hollow regions facilitate drilling different sized holes through these devices so that they can firmly grip overhead lines of various diameters. Such overhead lines may be electrical power lines, cables, telephone lines, guy wires, etc. Electrical power lines will be used for illustrative purposes in this patent disclosure since they will probably be the type of line upon which applicant's vibration damping/sag adjustment devices will most frequently be mounted.

A need for applicant's vibration damping/sag adjustment devices follows from the fact that, under present design and use practices, vibration damping/sag adjustment devices do not have interiors having hollow regions to facilitate drilling larger holes in these devices in order to accommodate lines having corresponding larger diameters. Rather, under current practices, vibration damping/sag adjustment devices are provided with a hole having a specific diameter to accommodate a specific line diameter. In other words, a given device can only be used on a line having a given diameter. Thus, under current practices, vibration damping/sag adjustment devices having a given hole diameter must be stocked for each different line diameter in an electrical distribution or grid system.

For example, electrical power lines normally have diameters running from as small as about 0.125" to as large as about 3.500". Some of the more commonly used diameters for electrical power lines include, but are by no means limited to, 0.563", 0.600", 0.750", 1.00", 1.320", 1.427" and 1.750". Thus, under current practices, a power line operator must maintain an inventory of vibration damping/sag adjustment devices for each line diameter in its electrical distribution system.

These inventorying practices follow in large part from the fact that most vibration damping/sag adjustment devices are typically made of dense metals such as zinc or lead (or alloys thereof). They usually have lengths of from about 6 inches to about 24 inches. Consequently, very large, rugged, powerful and highly specialized drills (and their associated tooling) are needed to drill holes in these rather large, solid metal vibration damping/sag adjustment devices. Typically, an electrical power company, for example, does not have—and, indeed, usually does not want to have—such specialized drilling equipment in its general maintenance shops.

Hence, the vendor of such vibration damping/sag adjustment devices is usually the party called upon to own and operate these specialized drilling machines. Since the vendors of such vibration damping/sag adjustment devices are rarely located where these vibration damping/sag adjustment devices are actually employed, the newly ordered and newly drilled devices must be shipped to locations that are reasonably close to wherever they are actually needed. Such shipments often must be made on an "emergency, rush basis." Shipping delays are exceeding irksome because power restoration in large portions of an entire electrical power system may be held up for want of these devices. Moreover, because the vibration damping/sag adjustment devices used on electrical power transmission lines often weigh from 50 to 100 pounds, their "emergency, rush basis" shipping is often very costly. Hence, both power line companies and their vibration damping/sag adjustment device vendors each tend to stock a sizable inventory of these devices for each commonly used line diameter. Thus, in actual practice, some vibration damping/sag adjustment devices having certain hole diameters may be used up quickly, especially in an emergency situation, while other such devices having different hole diameters may be used very infrequently. Hence, these seldom used devices represent "excessive inventory"—and, hence, economic waste.

Applicant has solved these drilling and inventorying problems by providing vibration damping/sag adjustment devices that can be readily drilled to any desired hole size using much more commonly available drilling equipment. This ability follows from the fact that applicant's vibration damping/sag adjustment devices have certain hereinafter more fully described hollow regions within their bodies. The pressure of these hollow regions greatly facilitate drilling by less powerful, and less specialized drilling equipment. Hence, applicant's devices provide both the power company and the vendor with a "one size fits all line diameters" capability. That is to say that applicant's devices can be "adapted" for use on virtually any size line by drilling an appropriately sized hole through the device with more commonly available drilling equipment.

BRIEF DESCRIPTION OF THE DRAWINGS

FIG. 4 is a side view of applicant's adaptable, vibration damping/sag adjustment device.

FIG. 5 is an end view of the device shown in FIG. 4.

FIG. 6 is a cross section view of applicant's device as seen along section line 6—6 of FIG. 5.

FIG. 7 is a cross section view of applicant's device as seen along section line 7—7 of FIG. 6.

DETAILED DESCRIPTION OF THE INVENTION

Figure 1:
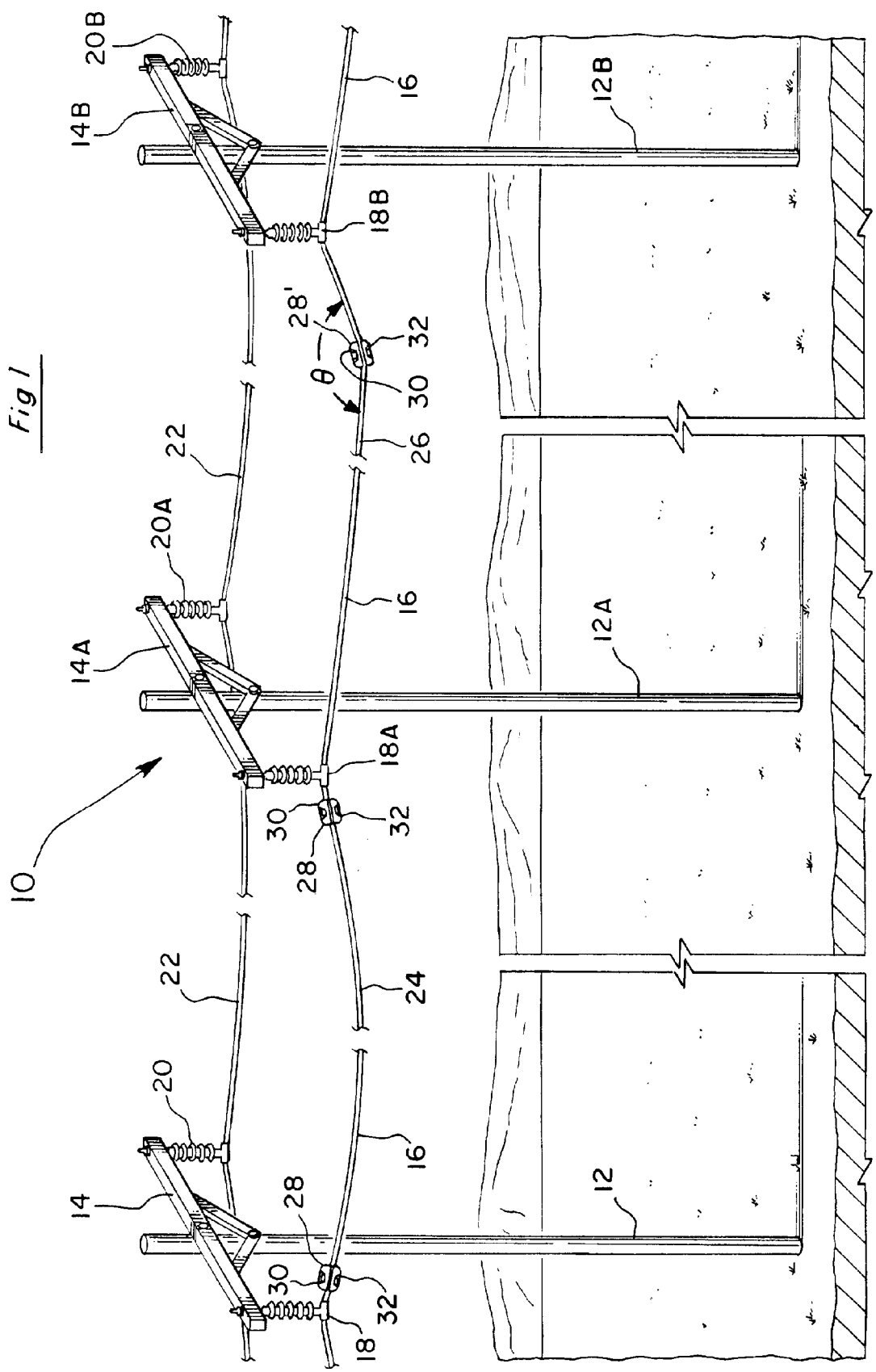
FIG. 1 is a perspective, side elevation view of a power transmission line system having the adaptable, line vibration damping/sag adjustment devices of this patent disclosure attached at various places in that system.

FIG. 1 depicts a portion of an electrical power distribution system 10 that employs several of applicant's vibration damping/sag adjustment devices. The system 10 is generally characterized by its use of a series of power line support structures such as poles 12, 12A, 12B, etc. These poles are respectively provided with cross bars 14, 14A, 14B, etc. for supporting overhead power transmission lines. One such overhead power transmission line 16 is shown suspended by insulators 18, 18A, 18B, etc. that respectively depend from the foreground side of the series of cross bars 14, 14A, 14B, etc. Another series of such support/insulating devices 20, 20A, 20B, etc. is shown supporting a second, power line 22 on the opposite side of the cross bars 14, 14A, 14B, etc.

The span of the power line 16 supported between poles 12 and 12A is shown hanging with a normal "catenary sag" contour 24. The span of the power line 16 supported between poles 12A and 12B is shown hanging in a non-catenary or "abnormal" contour 26. The span of power line 16 between posts 12 and 12A having the catenary sag contour 24 is shown provided with an adaptable, power line vibration damping/sag adjustment device 28 of this patent disclosure near its left end (i.e., near pole 12). Another such device 28 is shown associated with the line 16 near pole 12A. Generally speaking, if one such device 28 is placed near the support/insulator 18 associated with pole 12 and another such device 28 is placed near the support/insulator 18A associated with pole 12A, the two devices 28 will serve to dampen vibrations (both aeolian and galloping type vibrations) in the span of the line 16 located between said poles 12 and 12A.

Again, the span of power line 16 located between poles 12A and 12B does not display a catenary sag. This follows from the fact that another adaptable, power line vibration damping/sag adjustment device 28', which also is made according to the teachings of this patent disclosure, has been placed on line 16 in a location that is nearer to pole 12B than it is to pole 12A. This placement creates a line sag contour 26 that is not catenary in nature, but rather has a discontinuous sag angle θ at or near the device 28' positioned between poles 12A and 12B. This device 28' is shown positioned nearer to pole 12B than to pole 12A. This arrangement causes that portion of the line 16 between insulator 18B and the θ sag angle-producing device 28' to be elevated above the ground more than it would have been, had the θ sag angle-producing device 28' not been placed on the line 16 nearer to pole 12B. Thus, the θ sag angle-producing device 28' shown between poles 12A and 12B is being used as a line "sag adjusting" device as well as a vibration damping device.

Figure 2:
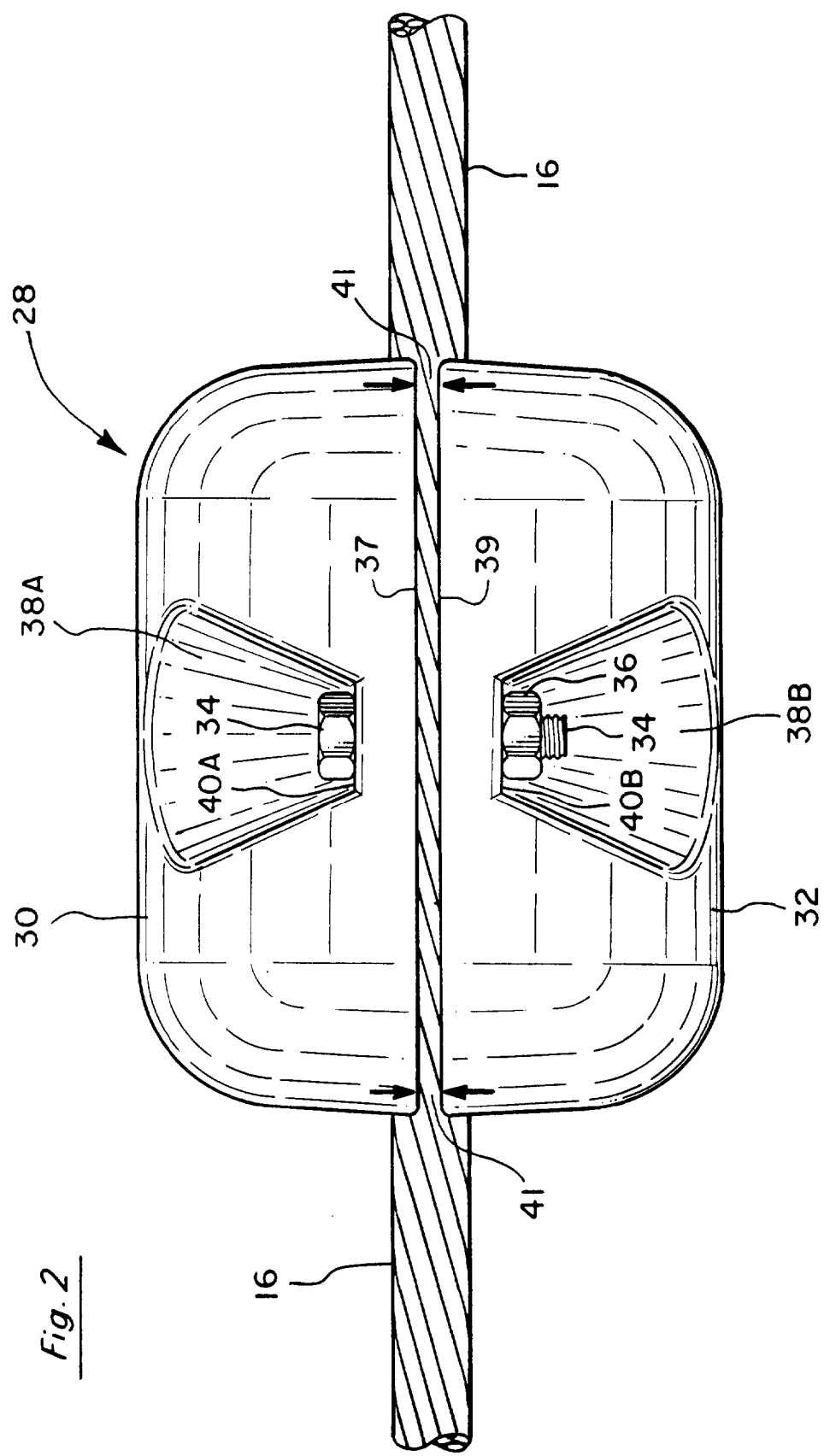
FIG. 2 is a side view of applicant's adaptable, line vibration damping/sag adjustment device shown attached to an overhead line such as a power line, power cable, telephone line, guy wire, etc.

FIG. 2 depicts the external features of an adaptable, power line vibration damping/sag adjustment device 28 made according to the teachings of this patent disclosure. The device 28 is generally comprised of a first half shell 30 and a second half shell 32. Both half shells of this vibration damping/sag adjustment device 28 are preferably made of a relatively dense metal such as lead (and its alloys), or zinc (and its alloys) or a relatively dense polymeric material such as that commonly referred to as "hard rubber." They also could be made of other metals such as tungsten, cast iron; or they also could be made of other suitably dense polymeric materials. Zinc and lead are, however, the most preferred construction materials. Generally speaking, these half shells are most easily made by casting or molding operations rather than by machining operations.

FIG. 2 depicts a power line, cable, phone line, guy wire, etc. 16 clamped between the two half shells 30 and 32. To this end, a bolt 34 is shown provided with a nut 36 that, through threaded cooperation, serve to tightly clamp the upper half shell 30 and lower half shell 32 around the line 16 and thereby holding the vibration damping/sag adjustment device 28 at a fixed location on that line. The presence of the space 41 shown between the half shells 30 and 32 is intended to suggest that each half shell is tightly clamped around, and solidly abutting against, the line 16 before the respective edges 37 and 39 of half shells 30 and 32 are forced into contact with each other by the tightening action supplied by the bolt 34/nut 36 system. Those skilled in this art will appreciate that it is a common power industry practice to "size" vibration damping/sag adjustment devices to the diameter of a given line 16 such that the gap or space 41 between their respective edges 37 and 39 is preferably from about 0.125" to about 0.250". FIG. 2 also illustrates how hand and tool access to the bolt 34 and nut 36 can be facilitated by virtue of the fact that both half shells 30 and 32 are provided with niches or indentations 38A and 38B in their respective sides. A similar bolt/nut and niche or indentation arrangement is positioned on the opposite side of each half shell 30 and 32 as is more clearly shown in FIG. 5.

Figure 3:
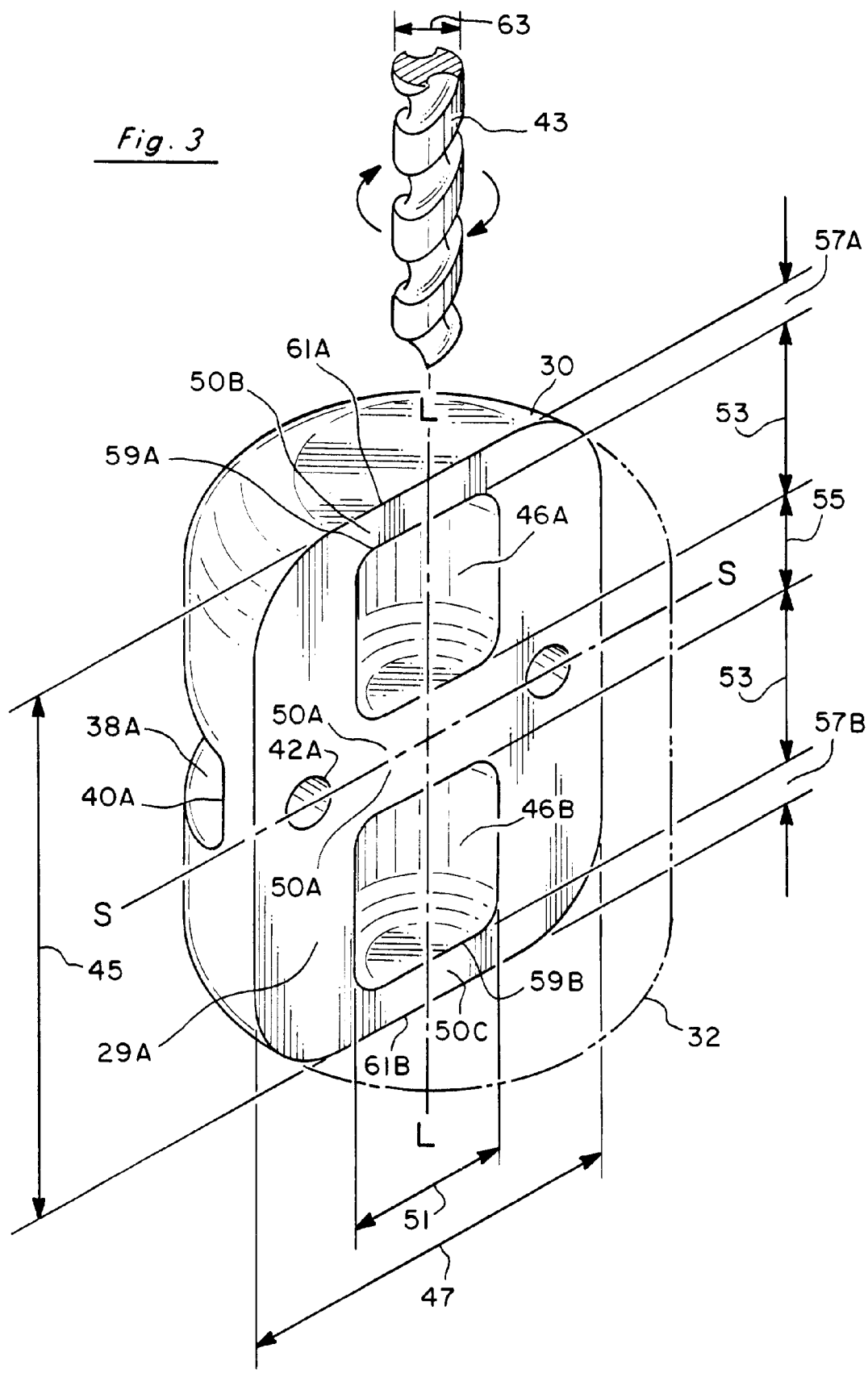
FIG. 3 is a perspective view of the half shell portions of an adaptable, vibration damping/sag adjustment device made according to the teachings of this patent disclosure.

FIG. 3 depicts a perspective view of the half shell 30 portion of applicant's overall vibration damping/sag adjustment device before it is drilled by a drill 43 in order for the device to fit around a power line of a given diameter. The outline of the second half shell 32 used to make up such a device 28, is shown in phantom lines in imaginary association with the first half shell 30. Half shell 30 is depicted with a generalized length 45 and a generalized width 47 that will be more fully discussed in subsequent parts of this patent disclosure. The first half shell 30 of FIG. 3 also is shown in association with a first imaginary center axis L—L and a second imaginary center axis S—S that is generally perpendicular to the first axis L—L. This perspective view also clearly illustrates one of the defining features of this invention, namely, the presence of at least two hollow regions 46A and 46B in the interior of the first half shell 30. More than two such hollow regions (e.g., 4, 6, etc.) could be employed in these devices, but applicant has found that the use of two distinct hollow regions generally produces the best overall results.

The first hollow region 46A is shown located on the upper side of the imaginary axis S—S. The second hollow region 46B is shown located on the lower or opposite side of the imaginary axis S—S. FIG. 3 also illustrates the fact that a solid central region 50A separates hollow region 46A from hollow region 48B. A similar solid region 50B is shown above the upper hollow region 46A. Similarly, an analogous solid region 50C is shown under hollow region 46B. Thus, the half shell 30 portion of applicant's adaptable, line vibration damping/sag adjustment device can be described in part as being a half shell having a: (i) a first imaginary axis and a second imaginary axis which is generally oriented perpendicular to said first imaginary axis, and wherein said half shell has, in a serial arrangement, (ii) a first solid region (e.g., 50B), (iii) a first hollow region (e.g., 46A) located on one side of the second axis (e.g., S—S), (iv) a second solid region (e.g., 50A) located between the first hollow region (46A) and a second hollow region (e.g., 46B), (v) a second hollow region (46B) located on the opposing side of the second axis and (vi) a third solid region (e.g., 50C).

FIG. 3 is also intended to suggest that, in order to use the vibration damping/sag adjustment device in one particularly preferred embodiment of this invention, a substantially semicircular trough will have to be drilled into the half shell 30—and into its opposing half shell 32. This is suggested by the presence of drill 43 in FIG. 3. Preferably, such a drill 43 will create a trough through the flat face region 29A of half shell 30 in a line that generally runs through the imaginary axis line L—L as suggested in FIG. 3. An analogous flat face region of half shell 32 will be provided with a similar trough. A representative trough created in half shell 30 by such a drilling operation is illustrated as item 44A in FIGS. 4, 5, 6 and 7. The half shell 32 counterpart trough is designated as item 44B in these same figures.

Next, it should be noted that the adaptable, vibration damping/sag adjustment devices of this patent disclosure can have a wide variety of external shapes or configurations. For example, the half shell 30 shown in FIG. 3 is generally depicted as having a half tube or semi-ellipsoidal outer configuration. Hemispherical, rectangular, square, etc. configurations could just as well have been employed since this external contour is not critical to the vibration damping or sag adjustment functions or utility of these devices. These devices also may be made in any desired size or weight. For example, the half shell 30 shown in FIG. 3 could have a length 45 of from about 6" to about 24" and a width 47 of from about 4" to about 24" inches. When made of zinc or lead, such a half shell 30 will preferably weigh from about 25 pounds to about 50 pounds. Obviously, the larger the hollow regions 46A and 46B, the less such a half shell 30 will weigh. The shape and dimensions of the hollow regions 46A and 46B are not particularly critical to the damping/sag adjustment function(s) of applicant's sag adjustment devices. For example, a 25 pound half shell might have hollow regions 46A and 46B (which incidentally need not have identical, or even analogous, sizes and shapes) having widths, designated as item 51 in FIG. 3 of from about 1" to about 3.5" and lengths 53 from about 1" to about 5". Relatively larger half shells 30 (e.g., those weighing about 50 pounds) may be provided with hollow region having widths 51 of from about 1" to about 4.5" and lengths 53 from about 1" to about 6".

In all cases however, applicant has found that the width 55 of the solid region 50A between the hollow regions 46A and 46B should be at least about 1". Applicant also has found that, with respect to solid region 50B, the distance 57A from the outside edge 59A of hollow region 46A to the nearest outside surface 61A of such a half shell 30 should be at least about 0.125". Similarly, with respect to solid region 50C, the distance 57B from the outside edge 59B of hollow region 46B to the nearest outside surface 61B of the half shell 30 should be at least about 0.125".

Next, it should be noted that, as a practical matter, the diameter 63 of the drill 43 used to drill the troughs 44A and 44B shown in FIGS. 4 and 5 should not be greater than the width 51 of either of the hollow regions, 46A and 46B. This circumstance follows from the fact that less powerful drilling equipment is needed to drill holes in applicant's devices because they contain empty spaces (i.e., hollow regions 46A and 46B) that require no drilling power and/or drilling "stamina" to penetrate the body of the device in order to create troughs 44A and 44B such as those shown in FIGS. 4 and 5.

FIG. 4 depicts a side view of the device 28 shown in FIG. 2. FIG. 5 is an end view of that device as seen from the section line 5—5 view of FIG. 4. Again, the main components of the device 28 shown in FIG. 4 are an upper half shell 30 and a lower half shell 32. For the purposes of illustration only, these two half shells 30 and 32 are shown in FIG. 4 with a generally tube-like or ellipsoidal configuration; but, as previously noted, other configurations, such as those resembling a sphere, ellipsoid, rectangle, square, etc. could be employed. In any case, a bolt 34 and a nut 36 are shown, in exploded view fashion, in FIG. 4 as the preferred means for attaching half shell 30 to half shell 32. The use of two such bolt/nut systems (preferably in a center region of the device 28 as generally suggested in FIG. 4) is preferred over the use of other attaching means (e.g., levered locking clamps), in other (i.e., non-central) locations on such devices. To this, end, the upper half shell 30 is shown containing a bolt hole 42A for receiving bolt 34. Similarly, the lower half shell 32 is shown containing an analogous bolt hole 42B for receiving said bolt 34. Consequently, when the bolt 34 passes through both bolt holes 42A and 42B, it serves to align and hold the half shells 30 and 32 in a fixed relationship to each other. Again, this bolt/hole arrangement is preferably used near the center of the device in conjunction with the operation of a counterpart bolt/hole arrangement likewise centrally located on the opposite side of the device. Such a counterpart, second bolt/hole arrangement can be seen in FIG. 5. The bolts are intended to be tightened until the trough 44A of half shell 30 and the trough 44B of half shell 32 clamp against a power line residing in said troughs 44 and 44B. Preferably, the troughs will substantially surround and abut against the power line before the inside surface 37 of half shell 30 comes into contact with the inside surface 39 of shell 32. Again, it is a power industry practice to try to maintain a gap 41, such as the gap depicted in FIG. 2, between the two half shells. Again, this gap 41 will preferably be from about 0.125" to about 0.25" in width. Both the upper half shell 30 and the lower half shell 32 are preferably provided with niches or indentations 38A and 38B. They facilitate human hand and/or tool access to the bolt 34 and nut 36. The upper half shell 30 also is shown provided with a bolt head abutment surface 40A. An analogous bolt abutment surface 40B is shown in half shell 32.

FIG. 4 shows the upper half shell 30 provided with a generally semicircular trough 44A that passes through the entire half shell 30. Likewise, the lower half shell 32 is provided with a counterpart trough 44B. Thus, the two opposing troughs 44A and 44B will serve to substantially encompass, tightly clamp around and abut against, the subject line (such as line 16 of FIG. 2) when a tightening action is supplied by the threaded bolt 34/nut 36 system suggested in FIG. 4. This clamping/abutting action serves to tightly hold the device 28 at a given location on an overhead line.

FIG. 4 further illustrates how the upper half shell 30 is preferably provided with a first (left) hollow region 46A and a second (right) hollow region 46B. It also illustrates how the lower half shell 32 can be provided with a comparable first (left) hollow region 48A and a second (right) hollow region 48B that are respectively opposed to counterpart hollow regions 46A and 46B of half shell 30. The two hollow regions 46A and 46A of the upper hemisphere 30 are shown separated by the solid region 50A previously described with respect to FIG. 3. Likewise, the two hollow regions 48A and 48B of the lower half shell 32 are separated by a comparable solid region 50A'.

FIG. 5 is an end view, as seen from section line 5—5, of the device 28 shown in FIG. 4. It shows the device 28 shown in FIG. 5 as having a generally round cross section configuration. Once again, however, the half shells 30 and 32 need not necessarily have a round configuration—or, for that matter, even have the same configuration. The counterpart holes 42A' and 42B' to holes 42A and 42B are clearly illustrated in this view. FIG. 5 also serves to suggest that, in its preferred method of use, the two half shells 30 and 32 will not totally encompass a line which passes through their respective troughs 44A and 44B. Rather, these troughs 44A and 44B will clamp around and firmly abut against a line residing in these troughs before the two half shells 30 and 32 are forced into abutting contact by the action of the bolt/nut system. That is to say that the space 41 noted in the discussion of FIG. 2 will be defined between half shell 30 and half shell 32 in the manner shown in FIG. 5. FIG. 5 also serves to suggest that trough 44A of the upper half shell 30 and trough 44B of the lower half shell 32, most preferably, will have substantially semicircular cross sections. This is obviously a preferred trough configuration because the power lines that will be substantially encompassed and clamped by these troughs 44A and 44B will normally have generally circular cross sections.

FIG. 6 is a cross section view of the device 28 as seen from section line 6—6 of FIG. 5. FIG. 6 serves to illustrate the general region where physical contact between the upper shell 30 and a line (such as line 16 of FIG. 2) will take place, i.e., in regions 50B, 50A and 50C. Similarly contact with such a line will occur in analogous regions of half shell 32, i.e., those designated as 50B', 50' and 50C'. FIG. 7 is a cross section view of the device 28 as seen from section line 7—7 of FIG. 6. It illustrates the generally semicircular shape and location of trough 44A in the flat surface 29A made by the drill shown in FIG. 3. The counterpart trough 44B in counterpart surface 29B is also shown in its proper alignment with trough 44A. FIG. 7 also illustrates an embodiment of this invention wherein the hollow region 46B of half shell 30 and the hollow region 48B of half shell 32 each have generally semicircular cross sectional configurations.

Thus, these figures collectively show that, when they are ready to be placed upon a given line, the adaptable, line vibration damping/sag adjustment devices of this patent disclosure generally will be comprised of: (1) a first half shell having: (i) a first imaginary axis and a second imaginary axis perpendicular to said first imaginary axis, (ii) a substantially semicircular trough running through said first half shell in a direction generally parallel to the first axis, (iii) a first hollow region located on one side of the second imaginary axis, (iv) a solid region located between the first hollow region and a second hollow region, (v) a second hollow region located on the other side of the second imaginary axis, (vi) a first bolt hole that passes through one side of the first half shell and (vii) a second bolt hole that passes through an opposing side of the first half shell; (2) a second half shell likewise having: (i) a first imaginary axis and a second imaginary axis perpendicular to said first imaginary axis; (ii) a substantially semicircular trough running through the second half shell in a direction generally parallel to the first imaginary axis, (iii) a first hollow region located on one side of the second axis, (iv) a solid region located between the first hollow region and a second hollow region, (v) a second hollow region located on the other side of the second imaginary axis, (vi) a first bolt hole that passes through one side of the second half shell and (vii) a second bolt hole that passes through an opposing side of the second half shell; (3) a first bolt that passes though the first bolt hole in the first half shell and the first bolt hole in the second half shell and threadedly cooperates with a first nut; and (4) a second bolt that passes through the second bolt hole in the first half shell and the second bolt hole in the second half shell and threadedly cooperates with a second nut.

In another operative, but somewhat less preferred, embodiment of this invention, the half shells 30 and 32 are each provided with a substantially semicircular trough having a relatively small diameter, e.g., having a diameter from about 0.125" to about 0.250". Preferably such a relatively small diameter will mechanically cooperate with the smallest line diameter (e.g., from about 0.125" to about 0.250") in a subject power line. In any case, such troughs may be drilled into the half shells 30 and 32, or they may be originally molded into them. Thus, for example, the substantially circular holes created by molding or drilling troughs, such as the troughs 44A and 44B shown in FIG. 5, can serve as a "drill guide hole" for subsequent drilling operations when holes having larger diameters are drilled into applicant's devices. Here again, larger holes can be readily drilled in applicant's devices up to hole diameters that are such that they approximate the width of the hollow regions in the device, e.g., the width 51 of hollow regions 46A and 46B of FIGS. 4 and 5. Here again, the adaptability of this embodiment of applicant's devices 28 generally follows from the mere presence of hollow regions in the body of the device 28 since these hollow spaces facilitate relatively easy drilling of those larger holes needed to accommodate lines having comparably larger diameters.

Finally, those skilled in this art will appreciate that while this invention generally has been described in terms of the general discussions, specific examples, drawings and preferred embodiments, none of these should be taken individually as a limitation upon the overall inventive concepts which are set forth in the following claims.

I claim:

1. An adaptable, line vibration damping/sag adjustment device comprising:

(1) a first half shell having: (i) a first imaginary axis and a second imaginary axis perpendicular to said first imaginary axis, (ii) a right hollow region located on the right side of the second imaginary axis, (iii) a center solid region located between the right hollow region and a left hollow region located on the left side of the second imaginary axis and wherein said center solid region has a semicircular trough of uniform diameter that runs through a flat face region of said center solid region, (iv) a right solid region located between the right hollow region and a right end of the device and wherein the right solid region has a semicircular trough of uniform diameter that runs through a face region of said right solid region, (v) a left solid region located between the left hollow region and a left end of the device and wherein the left solid region has a semicircular trough of uniform diameter that runs through a flat face region of said left solid region, (vi) a first bolt hole that passes through one side of the first half shell and (vii) a second bolt hole that passes through an opposing side of the first half shell;

(2) a second half shell having: (i) a first imaginary axis and a second imaginary axis perpendicular to said first imaginary axis, (ii) a right hollow region located on the right side of the second axis, (iii) a center solid region located between the right hollow region and a left hollow region located on the left side of the second imaginary axis and wherein said center solid region has a semicircular trough of uniform diameter that runs through a flat face region of said center solid region, (iv) a right solid region located between the right hollow region and a right end of the device and wherein the right solid region has a semicircular trough of uniform diameter that runs through a face region of said right solid region, (v) a left solid region located between the left hollow region and a left end of the device and wherein the left solid region has a semicircular trough of uniform diameter that runs through a flat face region of said left solid region, (vi) and wherein the semicircular troughs in the center solid region, the right solid region and the left solid region are all of equal diameter, (vii) a first bolt hole that passes through one side of the second half shell and (viii) a second bolt hole that passes through an opposing side of the second half shell;

(3) a first bolt that passes through the first bolt hole in the first half shell and the first bolt hole in the second half shell and threadedly cooperates with a first nut; and (4) a second bolt that passes through the second bolt hole in the first half shell and the second bolt hole in the second half shell and threadedly cooperates with a second nut.

2. The device of claim 1 wherein the external surface of the half shell has a niche for the first bolt and a niche for the second bolt.

3. The device of claim 1 wherein the external surface of the half shell has a contour that is generally tubular in configuration.

4. The device of claim 1 wherein the first half shell and the second half shell are made from a material selected from the group consisting of zinc, lead and alloys thereof.

5. An adaptable, line vibration damping/sag adjustment device assembly comprising:

(1) a first half shell having: (i) a first imaginary axis and a second imaginary axis perpendicular to said first imaginary axis, (ii) a right hollow region located on the right side of the second imaginary axis, (iii) a center solid region located between the right hollow region and a left hollow region located on the left side of the second imaginary axis and wherein said center solid region has a semicircular trough of uniform diameter that runs through a flat face region of said center solid region, (iv) a right solid region located between the right hollow region and a right end of the device and wherein the right solid region has a semicircular trough of uniform diameter that runs through a face region of said right solid region, (v) a left solid region located between the left hollow region and left end of the device and wherein the left solid region has a semicircular trough of uniform diameter that runs through a flat face region of said left solid (vi) a first bolt hole that passes through one side of the first half shell and (vii) a second bolt hole that passes through an opposing side of the first half shell;

(2) a line that is clamped by the semicircular trough running through the right solid region, the center solid region and the left solid region of the first half shell and by the semicircular trough running through the right solid region, center solid region and left solid region of a second half shell that is bolted to said first half shell;

(3) a second half shell having: (i) a first imaginary axis and a second imaginary axis perpendicular to said first imaginary axis, (ii) a right hollow region located on the right side of the second axis, (iii) a center solid region located between the right hollow region and a left hollow region located on the left side of the second imaginary axis and wherein said center solid region has a semicircular trough of uniform diameter that runs through a flat face region of said center solid region, (iv) a right solid region located between the right hollow region and a right end of the device and wherein the right solid region has a semicircular trough of uniform diameter that runs through a face region of said right solid region, (v) a left solid region located between the left hollow region and a left end of the device and wherein the left solid region has a semicircular trough of uniform diameter that runs through a flat face region of said left solid region, and wherein the diameters of the semicircular troughs of uniform diameter in the center solid region, the right solid region and the left solid region are all of equal diameter, (vi) a first bolt hole that passes through one side of the second half shell and (vii) a second bolt hole that passes through an opposing side of the second half shell;

(4) a first bolt hole that passes through the first bolt hole in the first half shell and the first bolt hole in the second half shell and threadedly cooperates with a first nut; and (5) a second bolt that passes through the second bolt hole in the first half shell and the second bolt hole in the second half shell and threadedly cooperates with a second nut.

6. The device of claim 5 wherein the external surface of the half shells each has a niche for the first bolt and a niche for the second bolt.

7. The device of claim 5 wherein the external surface of each half shell has a contour that is generally tubular in configuration.

8. The device of claim 5 wherein the first half shell and the second half shell are each made of a material selected from the group consisting of zinc, lead and alloys thereof.

* * * * *